(12) United States Patent
Kunimatsu et al.

(10) Patent No.: US 9,482,901 B2
(45) Date of Patent: Nov. 1, 2016

(54) LIQUID CRYSTAL DISPLAY DEVICE AND MANUFACTURING METHOD THEREOF

(71) Applicant: Japan Display Inc., Tokyo (JP)

(72) Inventors: Noboru Kunimatsu, Chiba (JP);
Masaki Matsumori, Tokai (JP);
Hidehiro Sonoda, Mobara (JP);
Yasushi Tomioka, Mobara (JP);
Toshiki Kaneko, Chiba (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/840,604

(22) Filed: Aug. 31, 2015

(65) Prior Publication Data

US 2015/0370102 A1    Dec. 24, 2015

Related U.S. Application Data

(63) Continuation of application No. 14/485,711, filed on Sep. 13, 2014, now Pat. No. 9,158,160, which is a continuation of application No. 13/407,137, filed on Feb. 28, 2012, now Pat. No. 8,873,006.

(30) Foreign Application Priority Data

Mar. 3, 2011  (JP) ................. 2011-046857

(51) Int. Cl.
*G02F 1/1337* (2006.01)
*G02F 1/1339* (2006.01)
*G02F 1/1333* (2006.01)
*G02F 1/1362* (2006.01)
*G02F 1/1368* (2006.01)

(52) U.S. Cl.
CPC ........... *G02F 1/1337* (2013.01); *G02F 1/1333* (2013.01); *G02F 1/1339* (2013.01); *G02F 1/1368* (2013.01); *G02F 1/13378* (2013.01); *G02F 1/13394* (2013.01); *G02F 1/133345* (2013.01); *G02F 1/133723* (2013.01); *G02F 1/133788* (2013.01); *G02F 1/136286* (2013.01)

(58) Field of Classification Search
CPC ........................... G02F 1/1337; G02F 1/1339
See application file for complete search history.

(56) References Cited

U.S. PATENT DOCUMENTS

| | | | |
|---|---|---|---|
| 5,780,199 A * | 7/1998 | Angelopoulos | C08G 73/1025 430/269 |
| 7,684,003 B2 | 3/2010 | Paik et al. | |
| 2009/0059155 A1 * | 3/2009 | Nakayama | G02F 1/13394 349/156 |

(Continued)

FOREIGN PATENT DOCUMENTS

| | | | |
|---|---|---|---|
| JP | 2007164134 | 6/2007 | |
| JP | 2009-080301 | * 4/2009 | ........... G02F 1/1337 |
| WO | 2010061491 A1 | 6/2010 | |

*Primary Examiner* — Sang V Nguyen
(74) *Attorney, Agent, or Firm* — Ulmer & Berne LLP

(57) ABSTRACT

The present invention prevents the shaving of an alignment film caused by a columnar spacer in a liquid crystal display device of an IPS method using photo-alignment. A plinth higher than a pixel electrode is formed at a part where a columnar spacer formed over a counter substrate touches a TFT substrate. When an alignment film of a double-layered structure is applied over the pixel electrode and the plinth, the thickness of the alignment film over the plinth reduces by a leveling effect. When photo-alignment is applied in the state, a photodegraded upper alignment film over the plinth disappears and a lower alignment film having a high mechanical strength remains. As a result, it is possible to prevent the shaving of the alignment film.

9 Claims, 11 Drawing Sheets

(56) References Cited

U.S. PATENT DOCUMENTS

| | | | |
|---|---|---|---|
| 2009/0104725 A1* | 4/2009 | Paik | G02F 1/13394 438/30 |
| 2009/0289260 A1* | 11/2009 | Sonoda | G02F 1/133723 257/72 |
| 2010/0066961 A1* | 3/2010 | Matsui | G02F 1/133723 349/129 |
| 2011/0199565 A1* | 8/2011 | Kunimatsu | G02F 1/133723 349/123 |
| 2011/0234055 A1 | 9/2011 | Fukano et al. | |
| 2011/0234955 A1 | 9/2011 | Mizusaki et al. | |
| 2012/0101236 A1* | 4/2012 | Sakumoto | C08G 73/10 525/426 |

* cited by examiner

D—D

LIQUID CRYSTAL DISPLAY DEVICE AND MANUFACTURING METHOD THEREOF

CROSS-REFERENCE TO RELATED APPLICATIONS

The present application is a continuation of U.S. patent application Ser. No. 14/485,711, filed Sep. 13, 2014, which is a continuation of U.S. patent application Ser. No. 13/407,137, filed Feb. 28, 2012, the entire disclosures of which are hereby incorporated herein by reference, and which claim priority from Japanese Patent Application JP 2011-046857 filed on Mar. 3, 2011, the content of which is hereby incorporated herein by reference into this application.

FIELD OF THE INVENTION

The present invention relates to a liquid crystal display device and in particular to a liquid crystal display device having a liquid crystal display panel to which alignment control capability is given by irradiating an alignment film with light.

BACKGROUND OF THE INVENTION

In a liquid crystal display device, a TFT substrate over which pixel electrodes and thin film transistors (TFTs), etc. are formed in a matrix shape and a counter substrate over which color filters, etc. are formed at locations corresponding to the pixel electrodes of the TFT substrate in the manner of opposing the TFT substrate are disposed and a liquid crystal is interposed between the TFT substrate and the counter substrate. Then an image is formed by controlling the transmissivity of light in liquid crystal molecules of each pixel.

A liquid crystal display device is widely used in various fields ranging from a large display device such as a TV to a cellular phone, a DSC (Digital Still Camera), etc. since it is flat and lightweight. Meanwhile, a liquid crystal display device has the problem of a view angle characteristic. The view angle characteristic means that brightness varies or chromaticity varies when a screen is viewed from the front and then from an oblique direction. With regard to the view angle characteristic, an In Plane Switching (IPS) method of operating liquid crystal molecules by an electric field in the horizontal direction has an excellent characteristic.

A conventional method of subjecting an alignment film used in a liquid crystal display device to alignment treatment, namely giving alignment control capability, is a method of applying rubbing treatment. The alignment treatment by rubbing is a method of applying alignment treatment by rubbing an alignment film with a cloth. In contrast, there is a method called a photo-alignment method of giving alignment control capability to an alignment film in a noncontact manner. In the IPS method, the performance is better when a pre-tilt angle is small and hence the photo-alignment method is advantageously used.

Meanwhile, in a liquid crystal display device, it is important to control the space between a TFT substrate and a counter electrode. In many cases, the space between a TFT substrate and a counter electrode is controlled by forming a columnar spacer on a counter substrate and forming a plinth to receive the columnar spacer on the TFT substrate. A liquid crystal display device with a touch panel is frequently used in recent years. When a liquid crystal display device is touched, the space between the TFT substrate and the counter substrate of the liquid crystal display panel varies and the positional relationship between a columnar spacer and a plinth deviates. As a result, touching fault such as bleeding or uneven color appears in an image.

A liquid crystal display device having a configuration of setting the positional relationship between a columnar spacer and a plinth so as to be immovable by reducing the area of the plinth smaller than the area of the columnar spacer is described in JP-A No. 2007-164134.

When a columnar spacer is used, an alignment film for initially aligning a liquid crystal is formed also between the columnar spacer and a plinth formed on a TFT. When a liquid crystal display device is touched with a finger or the like, stress is imposed between the columnar spacer and the plinth, giving rise to the phenomenon that the alignment film is shaved and shavings are caused. Such shavings cause the occurrence of blight spots in a display region. Neither such a problem nor a measure is described in JP-A No. 2007-164134.

A photo-alignment film is formed in a double-layered structure in some cases. That is, the upper layer is formed with a material having polyamide acid ester containing cyclobutane and being likely to form photo-alignment by ultraviolet rays as a precursor, and the lower layer is formed with a material having polyamide acid not containing cyclobutane and being mechanically strong as a precursor.

"CF 1" shows the structural formula of polyamide acid ester containing cyclobutane.
(CF 1)

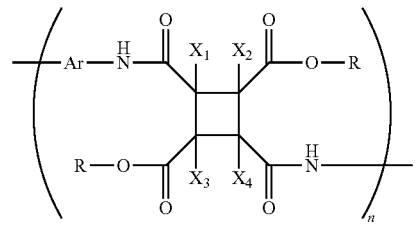

In "CF 1", Ar represents a divalent aromatic group, R represents an alkyl group having a carbon number of 1 to 8, and each of X1 to X4 represents hydrogen or an alkyl group having a carbon number of 1 to 3 independently.

"CF 2" shows the structural formula of polyamide acid not containing cyclobutane.
(CF 2)

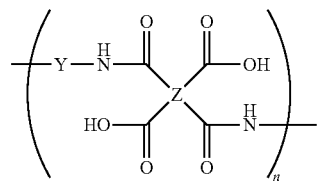

In "CF 2", Y represents a divalent organic group and Z represents a tetravalent organic group other than cyclobutane.

FIG. 16 is a schematic sectional view of a liquid crystal display device having a double-layered alignment film. In FIG. 16, a passivation film 107 is formed over a TFT substrate 100 including glass. Plural layers including a common electrode are formed between the passivation film 107 and the TFT substrate 100 but are omitted in FIG. 16. Pixel electrodes 108 are formed over the passivation film 107. An alignment film 113 including two layers of a lower alignment film 111 and an upper alignment film 112 is formed in the manner of covering the pixel electrodes 108. The upper alignment film 112 includes a photoreactive material produced by using polyamide acid ester as a precursor, has a film thickness reduced by photoreaction, and has a low mechanical strength. On the other hand, the lower alignment film 111 includes a non-photoreactive material produced by using polyamide acid as a precursor and the film thickness thereof does not reduce even after the irradiation of ultraviolet rays.

In FIG. 16, a black matrix 201 and a color filter 202 are formed over a counter substrate 200. An overcoat film 203 is formed over the black matrix 201 and the color filter 202 but is omitted in FIG. 16. A part where the color filter 202 is formed is a transparent region 400 and an image is formed by light transmitting the transparent region 400. A part where the black matrix 201 is formed is a nontransparent region 500.

In FIG. 16, a columnar spacer 204 to define a space between the TFT substrate 100 and the counter substrate 200 is formed over the black matrix 201. The tip of the columnar spacer 204 touches the upper alignment film 112 over the TFT substrate 100 and a plinth 114 made of the same material as the pixel electrodes 108 is formed at the part. The height of the top end of the plinth is the same as the height of the top ends of the pixel electrodes.

In the upper alignment film 112, photodecomposition reaction is generated by the irradiation of ultraviolet rays, the molecular weight decreases, and the alignment film strength lowers. If a heat shock test of −40° C. to 85° C. for example is applied to such a liquid crystal display device, the upper alignment film 112 peels off at the part of the plinth 114 and a very fine blight spot caused by the shavings is formed. The shavings of the alignment film are formed in the region R surrounded by the dotted line in FIG. 16. That is, it is estimated that a panel warps repeatedly because of the in-plane temperature distribution of the panel caused by a heat shock test, that the columnar spacer 204 formed on the side of the counter substrate 200 shaves the alignment film 113 over the plinth 114 on the side of the TFT substrate 100, that a fraction of the alignment film 113 floats in a liquid crystal, and that hence a blight spot occurs.

SUMMARY OF THE INVENTION

In view of the above situation, a problem of the present invention is to prevent a blight spot caused by the shaving of an alignment film from occurring in a liquid crystal display device using photo-alignment.

The present invention overcomes the above challenge and the representative means is as follows. That is, the means is a liquid crystal display device including pixels formed in regions surrounded by scanning lines and picture signal lines; a pixel electrode formed at each of the pixels over an insulation film; a TFT substrate supplying a picture signal to each of the pixel electrode through a TFT; a counter substrate formed opposite the TFT substrate; and a liquid crystal layer interposed between the TFT substrate and the counter substrate, wherein: a columnar spacer to retain a space from the TFT substrate is formed over the counter substrate; a plinth facing a tip of the columnar spacer is formed over the TFT substrate and an alignment film is formed so as to cover the plinth, the pixel electrodes, and the insulation film; photo-alignment treatment is applied to the alignment film; a top end of the plinth is higher than top ends of the pixel electrodes; the alignment film includes a lower alignment film formed by using polyamide acid as a precursor and an upper alignment film formed by using polyamide acid ester as a precursor; and, when the thickness of the lower alignment film is defined as p1 and the thickness of the upper alignment film is defined as p2, p2/p1 over the plinth is smaller than p2/p1 over the insulation film.

The present invention, in a liquid crystal display device having a columnar spacer and using a photo-alignment film, makes it possible to: prevent the shaving of the alignment film caused by the columnar spacer; and hence improve the manufacturing yield of the liquid crystal display device. Further, it is possible to: prevent the shaving of the alignment film caused by the columnar spacer because of a temperature cycle after shipping; and hence prevent market failure from occurring.

DETAILED DESCRIPTION OF THE PREFERRED EMBODIMENTS

Figure 1:
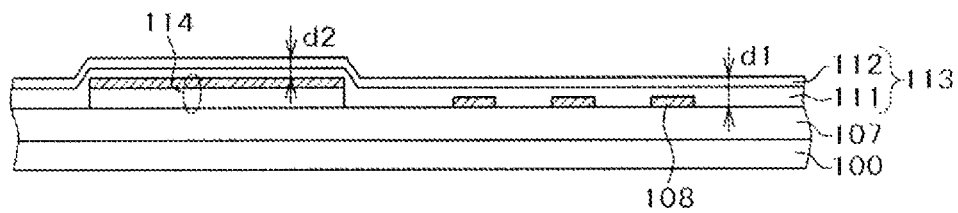
FIG. 1 is a sectional view of a TFT substrate showing the state of applying an alignment film according to the present invention.
Figure 2:
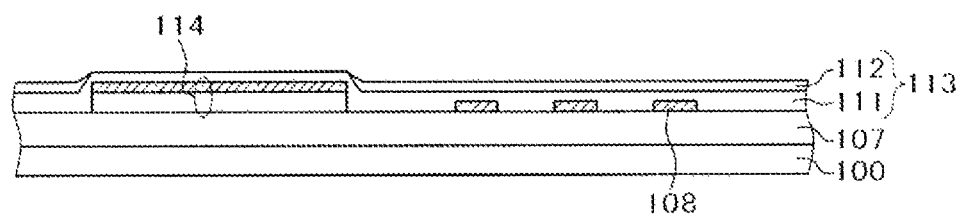
FIG. 2 is a sectional view of a TFT substrate showing the state after photo-alignment treatment is applied to the state shown in FIG. 1.
Figure 3:
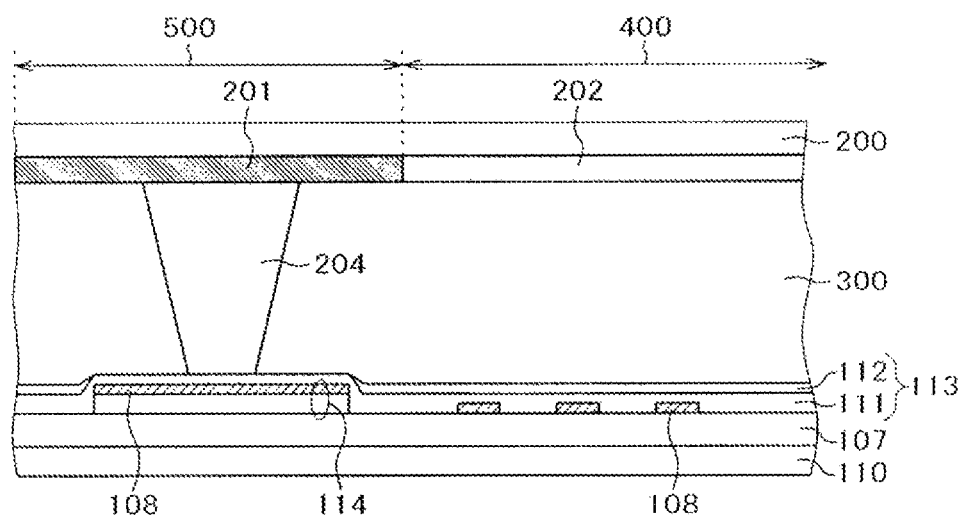
FIG. 3 is a sectional view of a liquid crystal display device showing the state of disposing a counter substrate to the state shown in FIG. 2.

FIGS. 1 to 3 are sectional views on the side of a TFT substrate 100 showing the process for forming a substantial part in the present invention. In FIG. 1, a passivation film 107 is formed over the TFT substrate 100 made of glass. A layer formed between the passivation film 107 and the TFT substrate 100 is omitted in FIG. 1. In FIG. 1, pixel electrodes 108 are formed over the passivation film 107. The part where the pixel electrodes 108 are formed is a pixel region.

A plinth 114 for a columnar spacer 204 is formed at a part where the pixel electrodes 108 are not formed. The part of the plinth 114 includes a film formed with the same material as the pixel electrodes 108 and another film. Consequently, the tip of the plinth 114 is higher than the tips of the pixel electrodes 108. An alignment film 113 is formed in the manner of covering the pixel electrodes 108 and the plinth 114.

The alignment film 113 includes a lower alignment film 111 formed by using polyamide acid not having photoreactivity but being mechanically strong as a precursor and an upper alignment film 112 formed by using polyamide acid ester having photoreactivity as a precursor. The material for the alignment film is a substance produced by blending polyamide acid ester and polyamide acid at the ratio of 4 to 6 and, when the substance is applied over the pixel electrodes 108 and others, the substance is separated into two upper and lower layers so that the upper layer may be polyamide acid ester and the lower layer may be polyamide acid. Since the quantity of polyamide acid ester is smaller than the quantity of polyamide acid, the thickness of the upper alignment 112 is somewhat smaller than the thickness of the lower alignment film 111. Further, since the part of the plinth 114 is higher than the part of the pixel electrodes 108, the thickness of the alignment film 113 at the part of the plinth 114 is small by a leveling effect. Successively the formed alignment film 113 is baked at about 200° C. to 230° C. FIG. 1 shows the state.

FIG. 2 is a sectional view showing the state of applying alignment treatment by irradiating the alignment film 113 in the state of FIG. 1 with ultraviolet rays and thus irradiating the upper alignment film 112 formed by using polyamide acid ester as the precursor with the ultraviolet rays. When the upper alignment film 112 is irradiated with ultraviolet rays, the upper alignment film 112 causes photodecomposition reaction, the molecular weight reduces, and the film strength lowers. Further, a part of the upper alignment film 112 causing the photodecomposition reaction evaporates. Consequently, the thickness of the upper alignment film 112 reduces to a certain extent.

Since the alignment film 113 at the part of the plinth 114 is thin from the beginning, the upper alignment film 112 is also thinner than the other part. Consequently, when the upper alignment film 112 decomposes and evaporates by photoreaction, the upper alignment film 112 almost disappears at the part of the plinth 114 as shown in FIG. 2. On the other hand, the lower alignment film 111 formed by using polyamide acid as the precursor does not photoreact and hence the lower alignment film 111 retains the original thickness and strength. Consequently, the component of the lower alignment film 111 having a high mechanical strength is predominantly large in quantity over the plinth 114.

Meanwhile, the alignment film 113 retains the double-layered structure at parts other than the plinth 114 including the pixel part. That is, at the part of the pixels too, the upper alignment film 112 photoreacts, photoreaction treatment is applied, a part of the upper alignment film 112 evaporates, and the thickness reduces to a certain extent. At the pixel region, however, since the thickness of the upper alignment film 112 is larger than the part of the plinth 114 from the beginning, even when a part evaporates, a certain film thickness necessary for aligning liquid crystal molecules is retained in the upper alignment film.

FIG. 3 is a sectional view showing the state of combining a counter substrate 200 over which a columnar spacer 204 is formed with a TFT substrate 100 thus formed. In FIG. 3, a liquid crystal layer 300 is interposed between the TFT substrate 100 and the counter substrate 200. The configuration on the side of the TFT substrate 100 in FIG. 3 is the same as that explained in FIG. 2. A black matrix 201 to form a nontransparent region 500 and a color filter 202 to form a transparent region 400 are formed over the counter substrate 200. An overcoat film 203 is omitted in FIG. 3. Further, an alignment film 113 is formed also over the counter substrate 200 but is omitted in FIG. 3. The columnar spacer 204 is formed at the part where the black matrix 201 is formed in FIG. 3.

The tip of the columnar spacer 204 touches the part of the plinth 114 over the TFT substrate 100 and the alignment film 113 at the part mostly includes the lower alignment film 111 formed by using polyamide acid having a high mechanical strength as the precursor as it has been explained in FIG. 2. That is, the upper alignment film 112 formed by using polyamide acid ester having a low mechanical strength as the precursor scarcely exists and hence it is possible to minimize the probability of generating the shaving of the alignment film 113 caused by the columnar spacer 204. Meanwhile, the black matrix 201 is formed over the counter substrate 200 corresponding to the part of the plinth 114 and hence light leakage does not occur even when liquid crystal molecules do not receive initial alignment.

In this way, the present invention makes it possible to prevent the shaving of an alignment film 113 occurring because a columnar spacer 204 touches the photo-alignment film 113. Further, it is possible to prevent blight spots from forming by the shavings. Concrete structures of the present invention are hereunder explained in reference to examples of a liquid crystal display device of an IPS method.

Example 1

Figure 4:
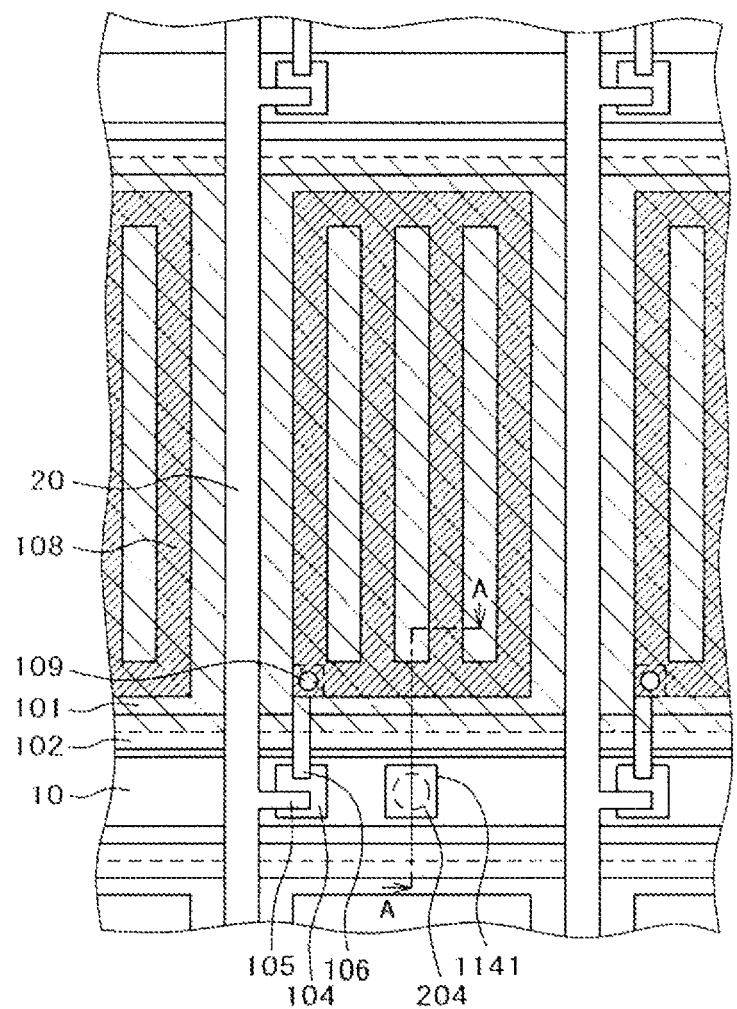
FIG. 4 is a plan view of a pixel part according to Example 1.
Figure 5:
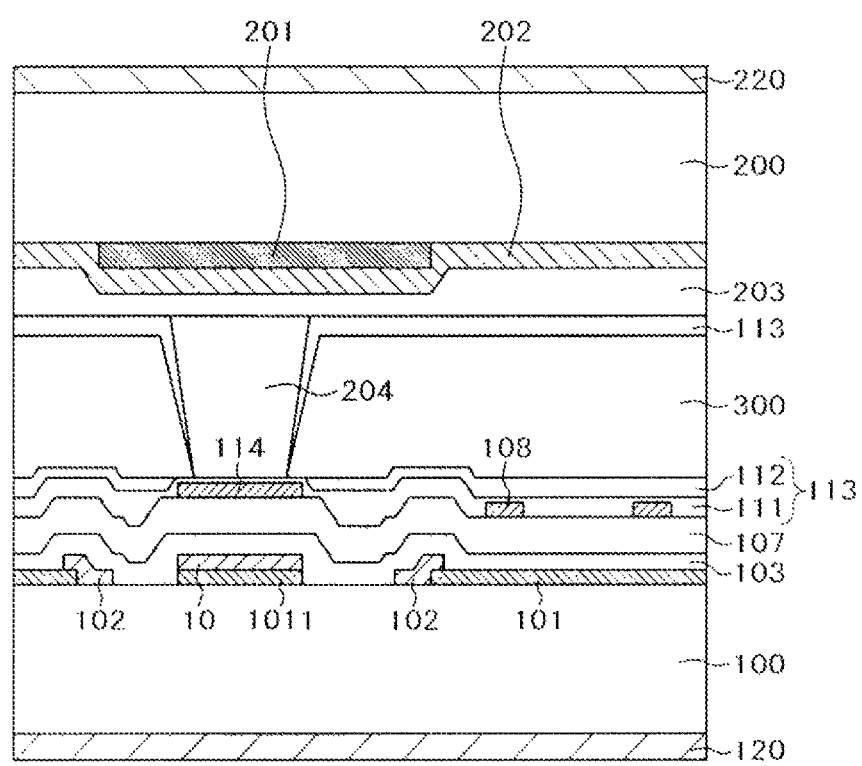
FIG. 5 is a sectional view taken on line A-A in FIG. 4.

FIG. 4 is a plan view of a pixel part according to Example 1 and FIG. 5 is a sectional view of a liquid crystal display device corresponding to the cross-section taken on line A-A in FIG. 4. In FIG. 4, a pixel is formed in a region surrounded by scanning lines 10 and picture signal lines 20. In a pixel, a common electrode 101 made of Indium Tin Oxide (ITO) is formed in the shape of a solid plane on the lower side and a common line 102 to supply common potential to the common electrode 101 is formed in an overlapping manner at an end of the common electrode 101. A pixel electrode 108 having slits is formed over the common electrode 101 while an insulation film is interposed. When a picture signal is supplied to the pixel electrode 108, a line of electric force is generated at a liquid crystal layer 300 between the pixel electrode 108 and the common electrode 101 through the slits, thereby liquid crystal molecules rotate, the quantity of light from a backlight is controlled, and thereby an image is formed.

In FIG. 4, a TFT is formed over a scanning line 10. A semiconductor layer 104 is formed over the scanning line 10 while a gate insulation film is interposed in between. A drain electrode 105 is formed by branching a picture signal line 20. A source electrode 106 is formed opposite the drain electrode 105 and the source electrode 106 extends in a pixel region and is electrically continuous with the pixel electrode 108 through a through hole 109.

In FIG. 4, a plinth 114 made of the same material as the pixel electrode 108 is formed over the scanning line 10. The plinth 114 is hereunder referred to as a pixel electrode plinth 1141. An insulation film exists between the pixel electrode plinth 1141 and the scanning line 10. Further, an alignment film 113 is formed over the pixel electrode plinth 1141. The tip of a columnar spacer 204 formed over a counter substrate 200 touches the part corresponding to the pixel electrode plinth 1141.

FIG. 5 is a sectional view of a liquid crystal display device corresponding to the cross-section taken on line A-A in FIG. 4. In FIG. 5, a lower polarizing plate 120 is formed outside a TFT substrate 100 and an upper polarizing plate 220 is formed outside a counter substrate 200. A liquid crystal layer 300 is interposed between the TFT substrate 100 and the counter substrate 200. In FIG. 5, a common electrode 101 made of ITO that is a transparent electrode is formed over the TFT substrate 100. A common line 102 to supply common potential to the common electrode 101 overlaps with an end of the common electrode 101. The common electrode 101 is formed in the manner of being electrically insulated from the scanning line 10.

The scanning line 10 has a double-layered structure; the lower layer includes an electrically-conductive layer 1011 made of ITO similarly to the common electrode 101 and the upper layer is made of the same metal as the common line 102. A metal constituting the scanning line 10 is MoW, Al alloy, etc., for example.

A gate insulation film 103 is formed in the manner of covering the scanning line 10 and the common electrode 101 and a passivation film 107 is formed over the gate insulation film 103. The pixel electrode 108 made of ITO that is a transparent electrode is formed over the passivation film 107. Meanwhile, a pixel electrode plinth 1141 is formed with ITO similarly to the pixel electrode 108 also over the passivation film 107 over the scanning line 10. As it is obvious from FIG. 5, the top end of the pixel electrode plinth 1141 is higher than the top end of the pixel electrode 108.

Since the alignment film 113 is applied in such a state, as shown in FIG. 1, the thickness of the alignment film 113 over the pixel electrode plinth 1141 reduces and, when the alignment film 113 is irradiated with ultraviolet rays in order to apply photo-alignment, the upper alignment film 112 formed by using polyamide acid ester as the precursor almost disappears over the pixel electrode plinth 1141. Consequently, over the pixel electrode plinth 1141, the lower alignment film 111 formed by using polyamide acid having a high mechanical strength as the precursor mostly exists and shavings are not easily caused even when the columnar spacer 204 touches the alignment film 113. Consequently, blight spots caused by the shavings of the alignment film 113 do not occur. In contrast, at the part of the pixel electrode 108 of a low height, the alignment film 113 is thick and hence the double-layered structure of the alignment film 113 is retained even after photo-alignment is applied by the irradiation of ultraviolet rays. That is, the upper alignment film 112 being subjected to photo-alignment treatment and having a prescribed thickness exists and hence liquid crystal molecules can be aligned.

In FIG. 5, a black matrix 201 and a color filter 202 are formed over the counter substrate 200. The black matrix 201 covers the part of the pixel electrode plinth 1141 and hence light from backlight does not permeate even when liquid crystal is not aligned at the part. In FIG. 5, an overcoat film 203 is formed in the manner of covering the color filter 202 and a columnar spacer 204 is formed over the overcoat film 203.

An alignment film 113 is formed in the manner of covering the overcoat film 203 and the columnar spacer 204. The alignment film 113 on the side of the counter substrate 200 also has a double-layered structure but, in FIG. 5, the alignment film 113 is drawn as a single-layered structure in order to avoid complicating the drawing. At the counter substrate 200, when the alignment film 113 is applied, the alignment film 113 having a prescribed thickness is formed over the overcoat film 203, but the columnar spacer 204 is high, and hence the alignment film 113 scarcely exists at the tip of the columnar spacer 204 due to a leveling effect. Further, even if the alignment film 113 remains at the tip of the columnar spacer 204, by the irradiation of ultraviolet rays for applying photo-alignment, the upper alignment film 112 formed by using polyamide acid ester as the precursor disappears and the lower alignment film 111 formed by using polyamide acid having a high mechanical strength as the precursor remains mostly. Consequently, it never happens that the alignment film 113 remaining on the side of the columnar spacer 204 is shaved and blight spots are caused by the shavings.

In this way, over both the TFT substrate 100 and the counter substrate 200, the structure is configured so that, at the part where the columnar spacer 204 touches the side of the TFT substrate 100, the upper alignment film 112 formed by using polyamide acid ester as the precursor may scarcely exist and blight spots caused by the shavings of the alignment film 113 may hardly occur.

Example 2

Figure 6:
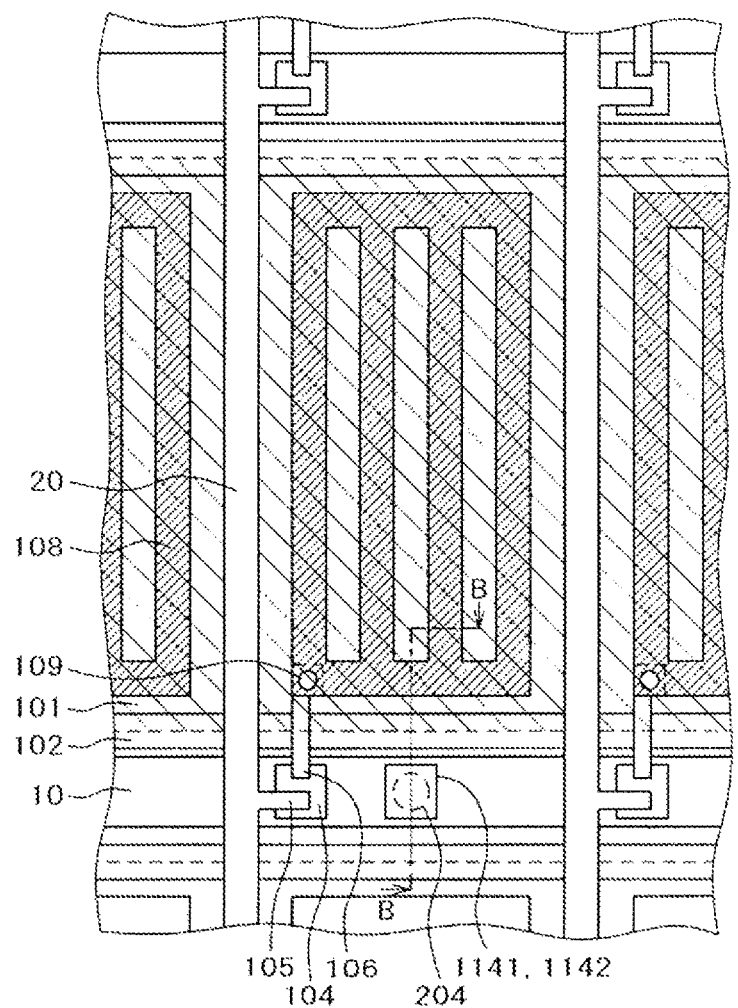
FIG. 6 is a plan view of a pixel part according to Example 2.

FIG. 6 is a plan view of a pixel part according to Example 2. The configuration in FIG. 6 is the same as that in FIG. 4 except the part of a plinth 114. In FIG. 6, the plinth 114 forms a composite plinth including a pixel electrode plinth 1141 and a plinth made of a semiconductor, namely a semiconductor plinth 1142. The tip of the plinth 114 is higher than that in Example 1 to the extent and a leveling effect when an alignment film 113 is applied is more likely to appear.

Figure 7:
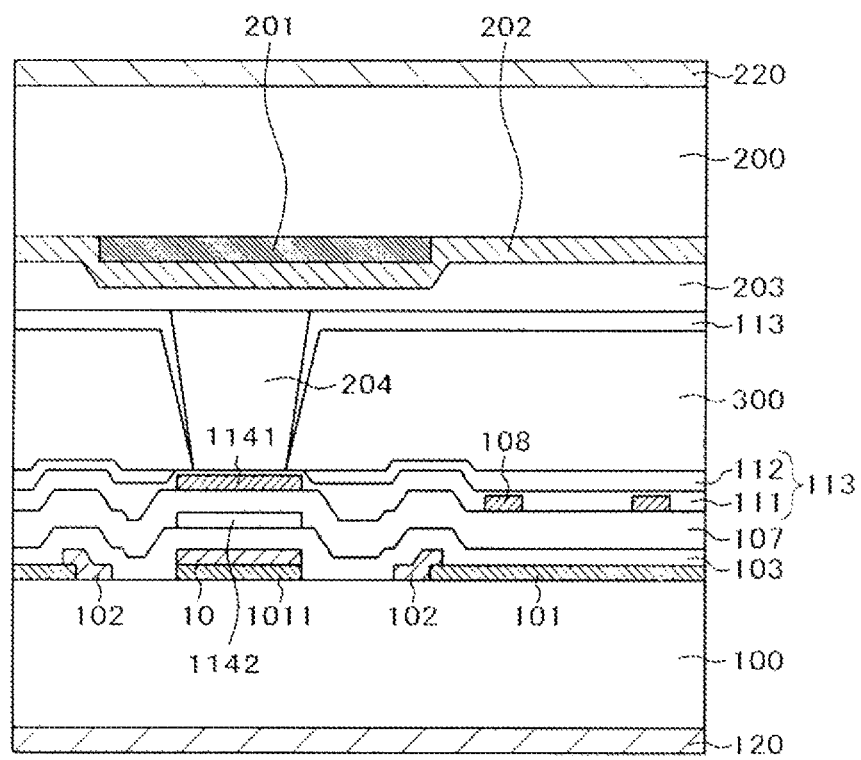
FIG. 7 is a sectional view taken on line B-B in FIG. 6.

FIG. 7 is a sectional view of a liquid crystal display device corresponding to the cross-section taken on line B-B in FIG. 6. The figure is the same as FIG. 5 except the plinth part formed over a scanning line 10. In FIG. 7, a semiconductor is formed over a gate insulation film 103 over the scanning line 10 and it constitutes a semiconductor plinth 1142. A passivation film 107 is formed over the semiconductor plinth 1142 and a pixel electrode plinth 1141 is formed over the passivation film 107 in the same manner as Example 1. That is, in the present example, the plinth 114 includes both the semiconductor plinth 1142 and the pixel electrode plinth 1141 and the height of the plinth 114 is higher than that in Example 1. By so doing, it is possible to exhibit the leveling effect more effectively when an alignment film 113 is applied. Consequently, at the part which the tip of a columnar spacer 204 touches, the probability that an upper alignment film 112 exists further lowers and the probability of the exfoliation of the alignment film 113 also lowers.

Example 3

Figure 8:
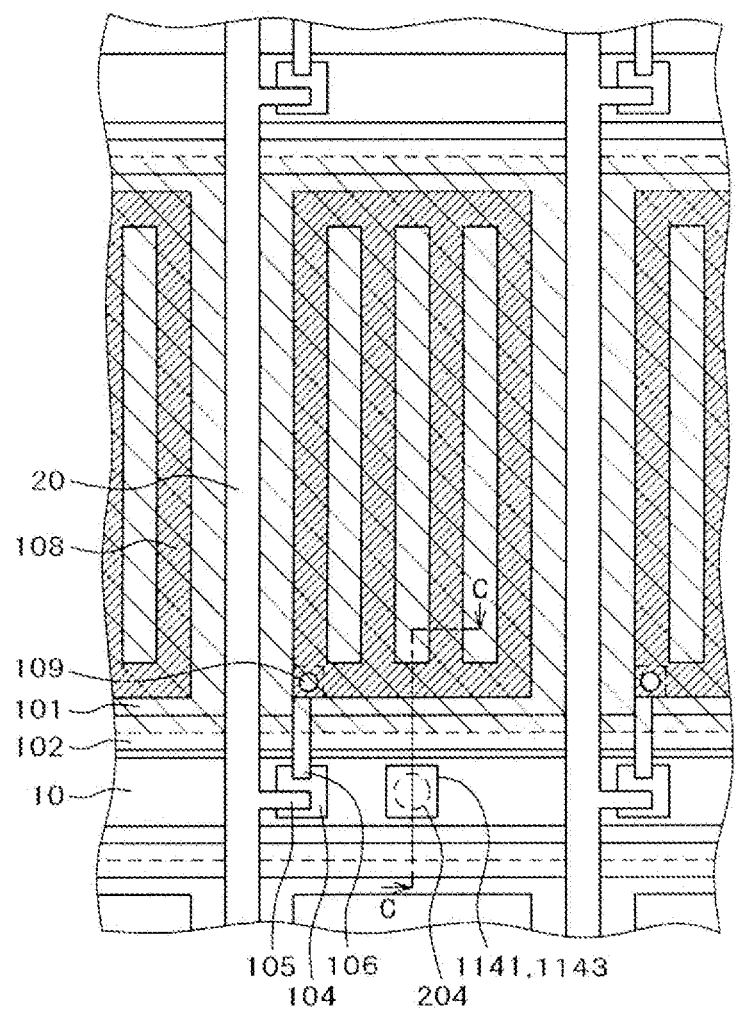
FIG. 8 is a plan view of a pixel part according to Example 3.

FIG. 8 is a plan view of a pixel part according to Example 3. The configuration in FIG. 8 is the same as that in FIG. 6 except the part of a plinth 114. In FIG. 8, the plinth 114 forms a composite plinth including a pixel electrode plinth 1141 and a plinth made of a material identical to a picture signal line 20, namely a picture signal line plinth 1143. The tip of the plinth 114 is higher than that in Example 1 to the extent and the leveling effect when an alignment film 113 is applied is more likely to appear.

Figure 9:
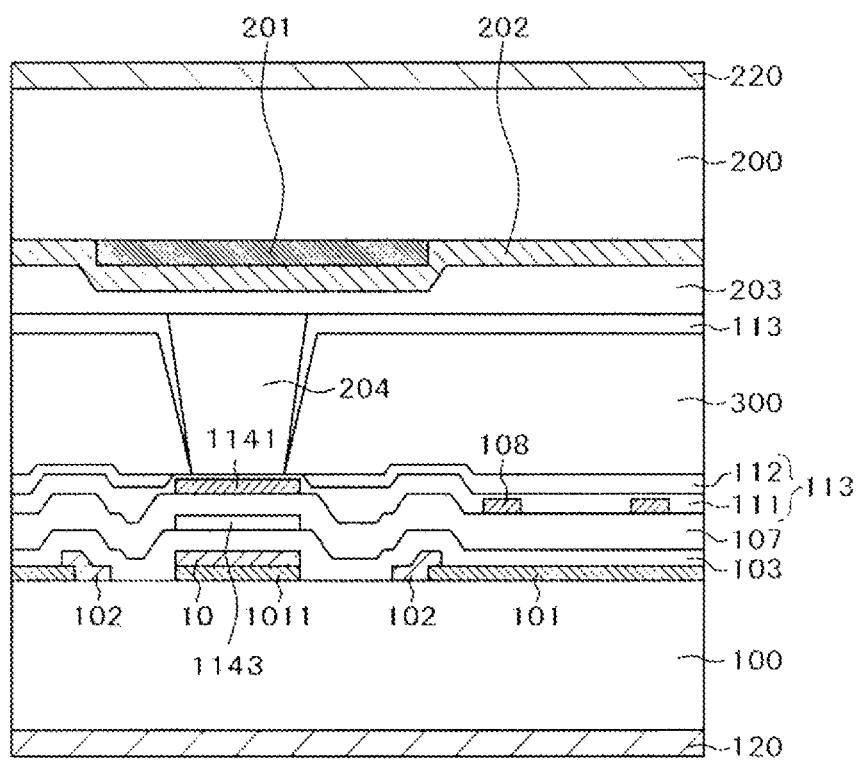
FIG. 9 is a sectional view taken on line C-C in FIG. 8.

FIG. 9 is a sectional view of a liquid crystal display device corresponding to the cross-section taken on line C-C in FIG. 8. The figure is the same as FIG. 7 in Example 2 except the plinth part formed over a scanning line 10. Both the cases of FIGS. 9 and 7 are the composite plinths but the difference in FIG. 9 from in FIG. 7 is that the lower side of the composite plinth is not a semiconductor plinth 1142 but a picture signal line plinth 1143 in FIG. 9.

In Example 3, the tip of the plinth 114 is higher than that in Example 1 to the extent corresponding to the existence of the picture signal line plinth 1143 and accordingly it is possible to yield the effect of leveling more effectively when an alignment film 113 is applied. Consequently, at the part which the tip of a columnar spacer 204 touches, the probability that an upper alignment film 112 exists further lowers and the probability of the exfoliation of the alignment film 113 also lowers.

Example 4

Figure 10:
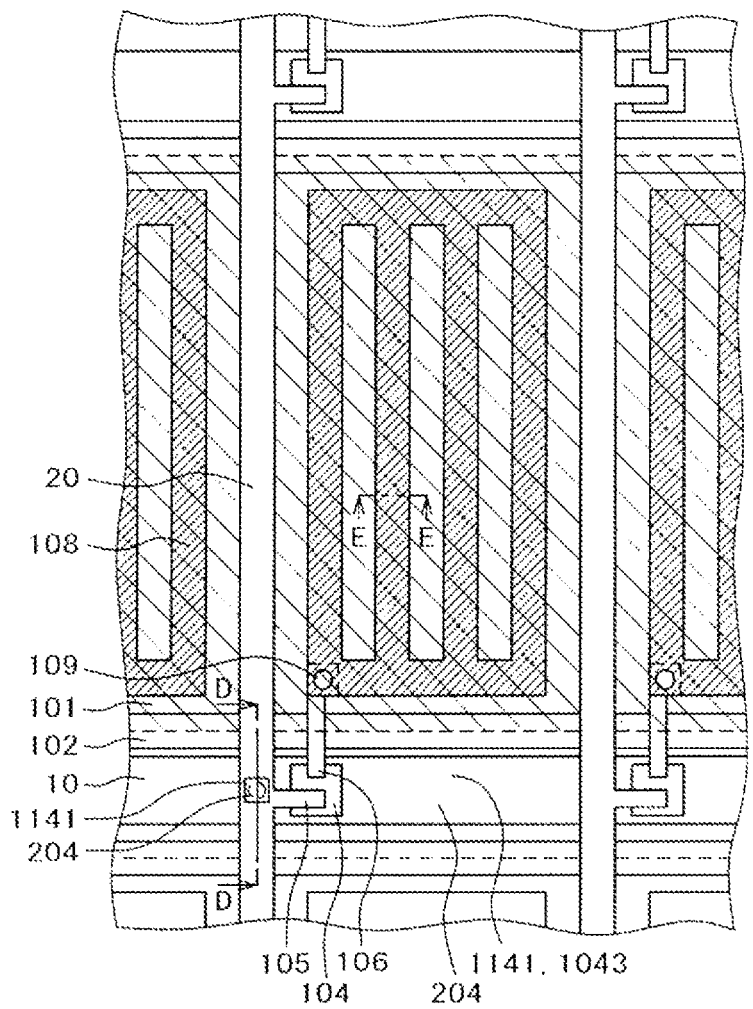
FIG. 10 is a plan view of a pixel part according to Example 4.

FIG. 10 is a plan view of a pixel part according to Example 4. The configuration in FIG. 10 is the same as that in FIG. 4 of Example 1 except the part of a plinth 114. In the present example, the plinth 114 is formed over a picture signal line 20. The purpose is to increase the height of the plinth 114 and to enhance the effect of leveling when an alignment film 113 is applied. At a counter substrate 200, the position of a columnar spacer 204 is also different from Example 1 and the like in conformity with the position of the plinth 114.

Figure 11:
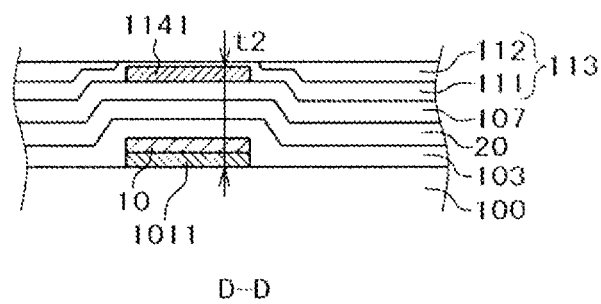
FIG. 11 is a sectional view taken on line D-D in FIG. 10.
Figure 12:
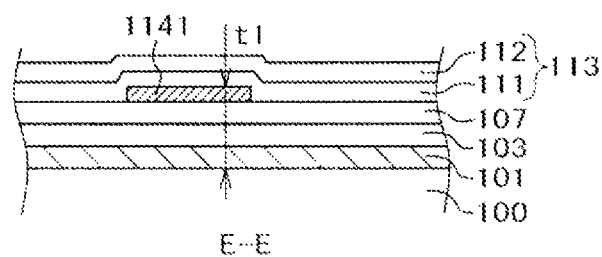
FIG. 12 is a sectional view taken on line E-E in FIG. 10.

FIG. 11 is a sectional view taken on line D-D in FIG. 10 and FIG. 12 is a sectional view taken on line E-E in FIG. 10. FIG. 11 is a sectional view of a part where a plinth 114 is formed and FIG. 12 is a sectional view of a part where a pixel electrode 108 is formed. In FIG. 11 showing the cross-section of the part where the plinth 114 is formed, six layers of an electrically-conductive layer 1011, a scanning line 10, a gate insulation film 103, a picture signal line 20, a passivation film 107, and a pixel electrode plinth 1141 are formed from the surface of a TFT substrate 100 to the upper face of the pixel electrode plinth 1141. In contrast, in FIG. 12 showing the cross-section of the pixel part, only four layers of a common electrode 101, a gate insulation film 103, a passivation film 107, and a pixel electrode 108 are formed from the surface of the TFT substrate 100.

Consequently, the distance t2 between the surface of the TFT substrate 100 and the upper part of the plinth 114 in FIG. 11 is larger than the distance t1 between the surface of the TFT substrate 100 and the upper part of the pixel electrode 108 in FIG. 12 to the extent corresponding to the sum of the thickness of the scanning line 10 and the thickness of the picture signal line 20. By so doing, it is possible to sufficiently exhibit a leveling effect when an alignment film 113 is applied. As a result, after photo-alignment is applied by the irradiation of ultraviolet rays, as shown in FIG. 11, at the part of the plinth 114 which the columnar spacer 204 touches, an upper alignment film 112 scarcely exists and only a lower alignment film 111 having a high mechanical strength exists. In contrast, since the part of the pixel electrode 108 is lower than the part of the plinth 114, the double-layered structure of the alignment film 113 is retained and it is possible to cause initial alignment of liquid crystal molecules by the upper alignment film 112.

In this way, in the present example too, while an initial alignment effect to liquid crystal molecules is retained, it is possible to prevent: the shaving of an alignment film 113 caused by a columnar spacer 204; and the occurrence of bright spots.

Example 5

Figure 13A:
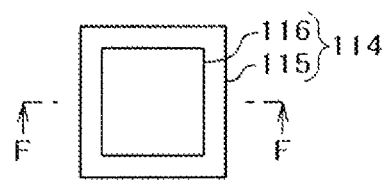
FIGS. 13A and 13B are an example of the shape of a plinth.
Figure 13B:
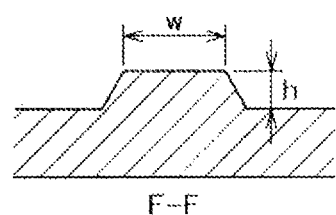

Although the present invention has been explained in the context of the structure of the pixel part of a liquid crystal display device in Examples 1 to 4, in the present example, the shape of the part of a plinth 114 and the component of an alignment film 113 are explained in detail. FIG. 13 is the case where the planar shape of a plinth 114 is square. FIG. 13A is a plan view and FIG. 13B is a sectional view taken on line F-F in FIG. 13A. In FIG. 13, the sectional shape of the plinth 114 is trapezoidal. That is, the radius of the plinth upper face 116 is smaller than the radius of the plinth lower face 115. In such a case, the radius of the narrowest part of the plinth 114 is defined as w that is the radius of the upper face. Further, in FIG. 13B, the height h of the plinth 114 is defined as the difference in height between the upper face of a pixel electrode 108 in a pixel region and the upper face of the plinth 114 in reference to FIG. 1 for example.

Figure 14A:
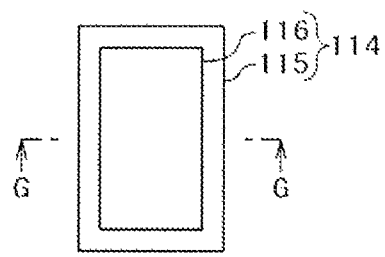
FIGS. 14A and 14B are another example of the shape of a plinth.
Figure 14B:
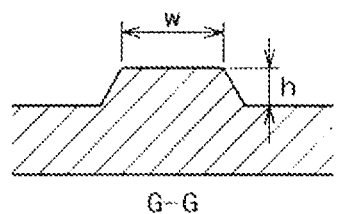

FIG. 14 is the case where the plane of a plinth 114 is rectangular. FIG. 14A is a plan view of the plinth 114 and FIG. 14B is a sectional view taken on line G-G in FIG. 14A. In FIG. 14, the narrowest part of the plinth 114 is the short radius w of the plinth upper face 116. Further, the definition of the height h of the plinth 114 in FIG. 14B is identical to that in FIG. 13.

Figure 15A:
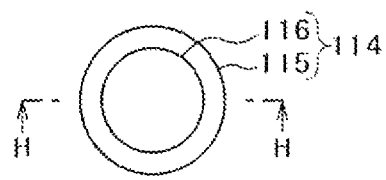
FIGS. 15A and 15B are yet another example of the shape of a plinth.
Figure 15B:
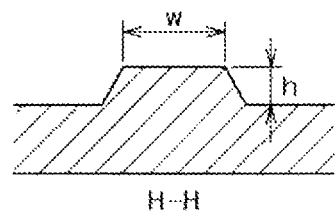
Figure 16:
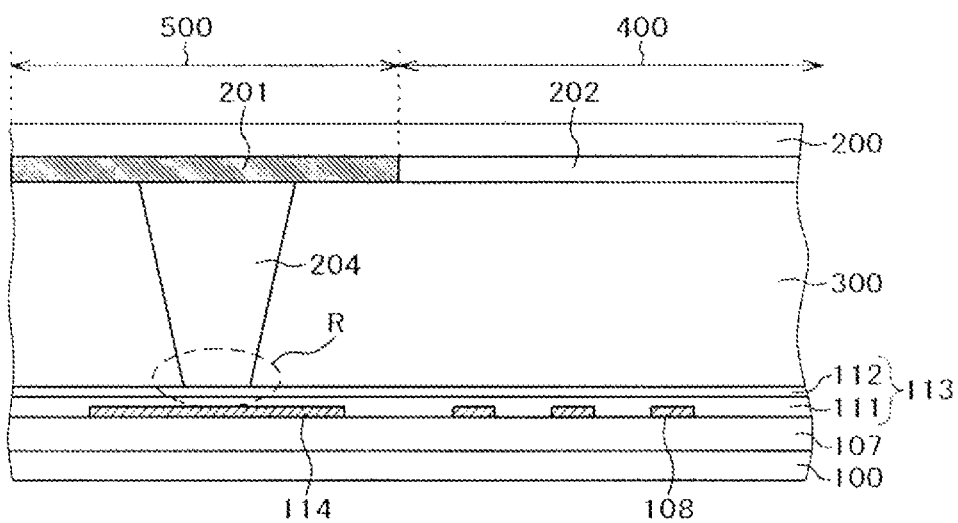
FIG. 16 is a sectional view of a liquid crystal display device not using the present invention.

FIG. 15 is the case where a plinth 114 is round. FIG. 15A is a plan view of the plinth 114 and FIG. 15B is a sectional view taken on line H-H in FIG. 15A. In FIG. 15, the narrowest part of the plinth 114 is the diameter w of the upper face of the plinth 114. Further, the definition of the height h of the plinth 114 in FIG. 15B is identical to that in FIG. 13.

Although the cross-sectional shape of a plinth 114 is trapezoidal in the above examples of the plinth 114, it may also be rectangular. Further, a plinth 114 in the above cases is just for showing an example of a height, a narrowest part, and the like and it does not mean that the shape of a plinth 114 is limited to the above three cases.

The present invention is characterized by: over a plinth 114, minimizing the existence of an upper alignment film 112 to the smallest possible extent and bringing a lower alignment film 111 having a high mechanical strength into contact with a columnar spacer 204; and over a pixel electrode 108, retaining the thickness of the upper alignment film 112 so as to be enough for aligning liquid crystal molecules and retaining a double-layered structure. In order to realize such a configuration, the shape of a plinth 114, the coating thickness of an alignment film 113, and a blend ratio of polyamide acid ester to polyamide acid in the material for the alignment film 113 are important.

Here, the following parameters are introduced:

a: As a plinth aspect ratio, plinth height h/plinth narrowest part width w;

b: Alignment film thickness over plinth/alignment film thickness over insulation film in pixel region. Here, an insulation film in a pixel region is a passivation film 107 in Examples 1 to 4 and other cases but another insulation film may exist instead of the passivation film 107 occasionally;

c: Ratio of polyamide acid ester in alignment film material. Here, the alignment film material is a mixture of polyamide acid ester and polyamide acid and c is the ratio of polyamide acid ester in the mixture. That is, when the quantity of polyamide acid ester is defined as x and the quantity of polyamide acid is defined as y, the expression $c=x/(x+y)$ is obtained. c satisfies the expression $0.2<c<0.8$, preferably the expression $0.3<c<0.7$; and d: Alignment film thickness d over insulation film in pixel region. d satisfies the expression 30 nm<d<150 nm, preferably the expression 40 nm<d<130 nm. Here, the expression cd>10 nm has to be satisfied. d represents the film thickness after photo-alignment, namely the film thickness in a liquid crystal display device. That is, the purpose is to leave at least 10 nm of the upper alignment film 112 formed by using polyamide acid ester as the precursor and sufficiently retain the initial alignment capability of liquid crystal in the pixel region.

When a, b, c, and d are defined as stated above, the relationship between the ratio c of polyamide acid ester in an alignment film material and other parameters is represented by the expression $c<80/(b(d+40))$, preferably $c<60/(b(d+40))$. Here, when the narrowest part w of a plinth 114 is not more than 10 μm, $b=0.9$ and, when the narrowest part w of a plinth 114 is more than 10 μm, $b=1/(13.9(a+0.08))+0.1$ and $b<0.9$.

As stated above, by selecting a plinth shape, an alignment film material, and an alignment film thickness, it is possible to obtain a configuration of such a liquid crystal display device as shown in Examples 1 to 4. The concrete features of a liquid crystal display device manufactured by the production method shown above are as follows.

A: The ratio of the thickness of an upper alignment film 112 to the thickness of a lower alignment film 111 is different between over a plinth 114 and over an insulation film in a pixel region. That is, the ratio of an upper alignment film 112 over a plinth 114 is smaller than that over an insulation film in a pixel region.

B: The ratio of an upper alignment film 112 formed by using polyamide acid ester as a precursor in an alignment film 113 over a plinth 114 is 0.3 or less, preferably 0.2 or less, and more preferably 0.1 or less.

C: The thickness of an upper alignment film 112 formed by using polyamide acid ester as a precursor in an alignment film 113 over a plinth 114 is 30 nm or less, preferably 20 nm or less, and more preferably 10 nm or less.

By the above configuration, in a liquid crystal display device using a photo-alignment film 113, it is possible to inhibit the exfoliation of the alignment film caused by a columnar spacer 204 and prevent the occurrence of blight spots caused by the shavings of the alignment film. Here, the plinths 114 described in Examples 1 to 4 are only examples and it is also possible to use the plinths 114 described in Examples 1 to 4 compositely. That is, with regard to a plinth 114, it is possible to increase the height of the plinth 114, enhance the leveling effect of an alignment film 113, and increase the effect of the present invention by stacking and using a pixel electrode plinth 1141, a semiconductor plinth 1142, a picture signal line plinth 1143, and the like. Further, over a picture signal line 20, it is possible to use a pixel electrode plinth 1141 and a semiconductor plinth 1142 compositely.

What is claimed is:

1. A liquid crystal display device comprising:
   a TFT substrate and a counter substrate;
   a liquid crystal layer disposed between the TFT substrate and the counter substrate;
   a plurality of scanning lines and a plurality of picture signal lines formed on the TFT substrate;
   a first insulation film formed above the plurality of scanning lines, the plurality of picture signal lines, and the TFT substrate;
   a first electrode formed on the first insulation film;
   a second insulation film formed on the first insulation film and the first electrode;
   a second electrode formed on the second insulation film; and
   an alignment film formed on the second electrode and the second insulation film,
   wherein the liquid crystal layer is driven by an electric field generated between the first electrode and the second electrode,
   wherein the second insulation film has a first portion disposed above the plurality of scanning lines or the plurality of picture signal lines;
   a distance from the TFT substrate to an upper surface of the second insulation film at the first portion is greater than a distance from the TFT substrate to an upper surface of the second electrode,
   wherein the alignment film comprises a first part subject to photo-alignment treatment,
   wherein the alignment film comprises a second part on the second electrode, and
   wherein the second part is disposed between the second insulation film and the first part, and
   wherein a precursor material of the first part and a precursor material of the second part are polyamide acid or polyamide acid ester,
   wherein a spacer is formed on the counter substrate and opposes to the first portion of the second insulation film, and
   wherein a spacer supporting base is formed on the TFT substrate and corresponds to the first portion and the spacer,
   when the thickness of the second part is defined as p1 and the thickness of the first part is defined as p2, p2/p1 over the first portion is smaller than p2/p1 over a second portion.

2. The liquid crystal display device according to claim 1, wherein the counter substrate has a spacer, and
   wherein the spacer opposes to the first portion of the second insulation film.

3. The liquid crystal display device according to claim 2, wherein the precursor material of the second part is not photo reactive.

4. The liquid crystal display device according to claim 3, wherein the first part of the alignment film does not essentially exist in the alignment film on the first portion of the second insulation film.

5. The liquid crystal display device according to claim 1, wherein a thickness of the alignment film on the first portion is thinner compared to a thickness of the alignment film on the second portion.

6. The liquid crystal display device according to claim 1, wherein the second part is mechanically stronger than the first part.

7. The liquid crystal display device according to claim 1, wherein a percentage of the second part on the first portion is bigger compared to a percentage of the second part on the second portion.

8. The liquid crystal display device according to claim 1, wherein the second portion of the insulating film is adjacent to the second electrode in a plan view.

9. The liquid crystal display device according to claim 1, wherein a material of the spacer supporting base is a material of the plurality of picture signal lines, a material of a semiconductor, or a material of a pixel electrode.

* * * * *